(12) United States Patent
Zheng et al.

(10) Patent No.: US 11,178,640 B2
(45) Date of Patent: Nov. 16, 2021

(54) METHODS AND DEVICES FOR BROADCAST SIGNALING TRANSMISSION

(71) Applicant: Telefonaktiebolaget LM Ericsson (publ), Stockholm (SE)

(72) Inventors: Yanli Zheng, Beijing (CN); Jinhua Liu, Beijing (CN); Jianfeng Wang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/336,543

(22) PCT Filed: Sep. 30, 2017

(86) PCT No.: PCT/CN2017/105093
§ 371 (c)(1),
(2) Date: Mar. 26, 2019

(87) PCT Pub. No.: WO2018/059594
PCT Pub. Date: Apr. 5, 2018

(65) Prior Publication Data
US 2020/0053696 A1 Feb. 13, 2020

(30) Foreign Application Priority Data
Sep. 30, 2016 (WO) ............... PCT/CN2016/101267

(51) Int. Cl.
*H04W 72/00* (2009.01)
*H04W 72/04* (2009.01)

(52) U.S. Cl.
CPC ..... *H04W 72/005* (2013.01); *H04W 72/0446* (2013.01)

(58) Field of Classification Search
CPC .......... H04W 72/005; H04W 72/0446; H04W 68/025; H04L 12/1881; H04L 5/001; H04L 5/0053
See application file for complete search history.

(56) References Cited

U.S. PATENT DOCUMENTS 9,866,299 B2 * 1/2018 Guey .................. H04B 7/0617
10,630,410 B2 * 4/2020 Parkvall .............. H04B 7/0452
(Continued)

FOREIGN PATENT DOCUMENTS

CN  101374262 A  2/2009
CN  101836446 A  9/2010
(Continued)

OTHER PUBLICATIONS

International Search Report and Written Opinion for International Patent Application No. PCT/CN2017/105093, dated Jan. 4, 2018, 13 pages.
(Continued)

*Primary Examiner* — Jay P Patel
(74) *Attorney, Agent, or Firm* — Withrow & Terranova, PLLC

(57) ABSTRACT

Embodiments of the present disclosure relate to methods and devices for broadcast signaling transmission. In example embodiments, the network device transmits first broadcast signaling in a first time duration of a first transmission window within a first transmission period. The network device then communicates with a terminal device in a broadcasting gap between the first time duration and a second time duration of the first transmission window subsequent to the first time duration. Further, the network device transmits the first broadcast signaling in the second
(Continued)

time duration. In this way, the interruptions caused by the long-time period reserved for the broadcast signaling transmission may be reduced.

20 Claims, 5 Drawing Sheets

(56) References Cited

U.S. PATENT DOCUMENTS

| | | | |
|---|---|---|---|
| 2012/0166584 A1* | 6/2012 | Kwon | H04L 67/16 709/217 |
| 2014/0140328 A1 | 5/2014 | Ling et al. | |
| 2015/0078153 A1 | 3/2015 | Kuo et al. | |
| 2016/0087765 A1* | 3/2016 | Guey | H04J 11/0079 370/330 |
| 2017/0127367 A1* | 5/2017 | Axnas | H04W 72/0446 |
| 2017/0265165 A1* | 9/2017 | Li | H04W 72/048 |
| 2017/0331577 A1* | 11/2017 | Parkvall | H04B 7/0452 |
| 2017/0331670 A1* | 11/2017 | Parkvall | H04L 41/0233 |
| 2017/0332440 A1* | 11/2017 | Xu | H04W 84/10 |
| 2018/0097554 A1* | 4/2018 | Guey | H04J 11/0079 |
| 2018/0255503 A1* | 9/2018 | Karlsson | H04W 48/12 |
| 2018/0317159 A1* | 11/2018 | Frenger | H04W 48/16 |
| 2019/0045424 A1* | 2/2019 | Rune | H04W 48/10 |
| 2019/0082491 A1* | 3/2019 | Shelby | H04W 16/14 |

FOREIGN PATENT DOCUMENTS

| | | |
|---|---|---|
| CN | 102223699 A | 10/2011 |
| CN | 102594474 A | 7/2012 |
| CN | 102938743 A | 2/2013 |
| CN | 105072565 A | 11/2015 |
| CN | 105637952 A | 6/2016 |
| WO | 2009009687 A2 | 1/2009 |
| WO | 2016144222 A1 | 9/2016 |

OTHER PUBLICATIONS

Mediatek Inc., "R1-167525: Beam Sweeping Design Issues in NR," 3GPP TSG RAN WG1 Meeting #85, Gothenburg, Sweden, Aug. 22-26, 2016, 7 pages.
Fujitsu, "R1-166678: Discussion on Initial access in NR," 3GPP TSG RAN WG1 Meeting #86, Gothenburg, Sweden, Aug. 22-26, 2016, 8 pages.
Extended European Search Report for European Patent Application No. 17855044.8, dated Mar. 26, 2020, 11 pages.
Notice of Reasons for Rejection for Japanese Patent Application No. 2019-517415, dated Mar. 17, 2020, 9 pages.
Examination Report for Indian Patent Application No. 201917009783, dated Oct. 31, 2020, 4 pages.
First Office Action for Chinese Patent Application No. 201780060244.0, dated Nov. 3, 2020, 16 pages.
Second Office Action for Chinese Patent Application No. 201780060244.0, dated Apr. 9, 2021, 12 pages.

* cited by examiner

METHODS AND DEVICES FOR BROADCAST SIGNALING TRANSMISSION

This application is a 35 U.S.C. § 371 national phase filing of International Application No. PCT/CN2017/105093, filed Sep. 30, 2017, which claims the benefit of International Application No. PCT/CN2016/101267, filed Sep. 30, 2016, the disclosures of which are incorporated herein by reference in their entireties.

TECHNICAL FIELD

Embodiments of the present disclosure generally relate to the field of telecommunication, and in particular, to methods and devices for broadcast signaling transmission.

BACKGROUND

Compared to current cellular systems, a New Radio (NR) system may require a network device (for example, an eNB) to transmit broadcast signaling less frequently, for example, in a longer transmission period, so as to reduce network energy consumption and unnecessary residual interferences. For example, it is proposed that an Access Information Table (AIT) is transmitted once every 10.24 seconds. Therefore, the transmission period is 10.24 seconds. It is also proposed that a Signature Sequence (SS) is transmitted every 100 ms. However, the longer transmission periods bring higher demands of a receiver performance. If a receiver is unable to decode the broadcast signaling in one transmission period, the receiver has to wait for the next transmission period to perform the decoding. In this situation, beamforming and/or repetitions are considered to be used to increase a transmission gain, and further to secure the receiver performance and compensate a larger path loss in higher frequencies, for example.

In order to enable multiple beams or repetitions in the broadcast signaling transmissions, it is proposed for the NR system that one fixed time period is reserved for beam sweeping or repeated transmissions. For example, a time period for the AIT is 10 ms, and a time period for the SS is 1 ms. In the time period, the network device continuously sweeps the beams for transmitting the AIT or SS. However, such fixed long time periods may cause a communication interruption between the network device and terminal devices served by the network device. The communication interruption may significantly degrade system performance and therefore be generally unacceptable. Moreover, if some urgent uplink traffic information is to be transmitted, the time period for the broadcast transmission will bring an unendurable long time delay.

Furthermore, a long data service interruption in downlink (DL) may also be induced if all antenna ports are used for the SS/AIT transmission because the data transmission and the SS/AIT transmission may probably need different beams. Further, if a digital beamforming scheme is used at the network device, a long data service interruption in UL will occur in a Time Division Duplex (TDD) system due to the long time period for the SS/AIT transmission in DL.

SUMMARY

In general, example embodiments of the present disclosure provide methods and devices for broadcast signaling transmission to solve at least one problem analyzed above. Also, example embodiments of the present disclosure provide related broadcasting schemes.

In a first aspect, a method implemented at a network device is provided. According to the method, the network device transmits first broadcast signaling in a first time duration of a first transmission window within a first transmission period. The network device then communicates with a terminal device in a broadcasting gap between the first time duration and a second time duration of the first transmission window. The second time duration is subsequent to the first time duration. Further, the network device transmits the first broadcast signaling in the second time duration.

In some embodiments, the network device may transmit the first broadcast signaling in the first time duration in a first beam direction of a set of beam directions, and transmit the first broadcast signaling in the second time duration in a second beam direction of the set of beam directions. The first beam direction is different from the second beam direction.

In some embodiments, the broadcasting gap may be associated with one or more of the following: a carrier frequency for downlink data communicated in the broadcasting gap, a carrier frequency for uplink information (for example, including data and signaling) communicated in the broadcasting gap, a service type for downlink/uplink information communicated in the broadcasting gap.

In some embodiments, one or more of the first and second time durations may be associated with one or more of the following: a carrier frequency for the first broadcast signaling, and a type of the first broadcast signaling. In some embodiments, a delay requirement of downlink data, and a delay requirement of uplink information will impact on the time duration for broadcasting signaling. Accordingly, in the design of the broadcasting scheme, these factors may be considered. In addition, two or more beams/repetitions may be used for transmission in the respective time durations. In practice, for the purpose of simplification, these factors may be omitted.

In some embodiments, the first broadcast signaling may include one or more of the following: a signature sequence, an access information table, and a paging message.

In some embodiments, the network device may further transmit the first broadcast signaling in a third time duration of the first transmission window subsequent to the second time duration. A broadcasting gap between the second and third time durations is equal to the broadcasting gap between the second and third time durations.

In some embodiments, the first broadcast signaling may be transmitted using a first broadcasting scheme. The network device may further transmit second broadcast signaling in a fourth time duration of a second transmission window within a second transmission period by using a second broadcasting scheme associated with the first broadcasting scheme. In some embodiments, the transmission scheme of the second broadcast signaling may be indicated by the information carried by the first broadcast signal.

In some embodiments, the first broadcast signaling may include a signature sequence, and the second broadcast signaling may include an access information table.

In a second aspect, a method implemented at a terminal device is provided. According to the method, the terminal device determines a first broadcasting scheme of first broadcast signaling transmitted by a network device within a first transmission period. The terminal device determines, based on the first broadcasting scheme, a second broadcasting scheme of second broadcast signaling to be transmitted by the network device within a second first transmission period subsequent to the first transmission period. As an example, the terminal device may determine a second broadcasting scheme of the second broadcast signaling based on the information carried by the first broadcast signal. Then, the terminal device detects the second broadcast signaling based on the second broadcasting scheme.

In some embodiments, the terminal device may detect the first broadcast signaling in within the first transmission period. The terminal device may then determine the first broadcasting scheme based on the detected first broadcast signal.

In some embodiments, the terminal device may detect the first broadcast signaling in a first time duration of a first transmission window within the first transmission period.

In some embodiments, the terminal device may further determine a broadcasting gap based on the first broadcasting scheme; determine, based on the broadcasting gap, a second time duration of the first transmission window, the second time duration being subsequent to the first time duration; and detect the first broadcast signaling in the second time duration.

In some embodiments, the terminal device may further communicate with the network device in the broadcasting gap second time duration.

In a third aspect, there is provided a device comprising a processor and a memory. The memory contains instructions executable by the processor, whereby the device is operative to perform the method according to the first or second aspect.

In a fourth aspect, there is provided a a computer readable storage medium tangibly storing a computer program. The computer program includes instructions which, when executed on at least one processor, cause the at least one processor to carry out the method according to the first or second aspect.

Through the following description, it would be appreciated that according to embodiments of the present disclosure, in one aspect, the separated time durations are used for the broadcast signaling transmission, and the broadcasting gap between the time durations are used for communications between the network device and terminal devices served by the network device. Accordingly, the network device transmits the broadcast signaling in non-consecutive time durations of a transmission window within a transmission period. The network device also communicates with a terminal device in the broadcasting gap. In this way, the interruptions caused by the long-time period reserved for transmitting the broadcast signaling may be reduced.

In another aspect, association or dependency between different broadcasting schemes for transmissions of different broadcast signaling is predetermined. Accordingly, the terminal device determines a broadcasting scheme of broadcast signaling based on a broadcasting scheme of further broadcast signaling. In this way, the signaling for notifying the broadcasting scheme to the terminal device may be saved, and the complexity/delay of the terminal device for determine the broadcasting scheme by blind detection may be reduced.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
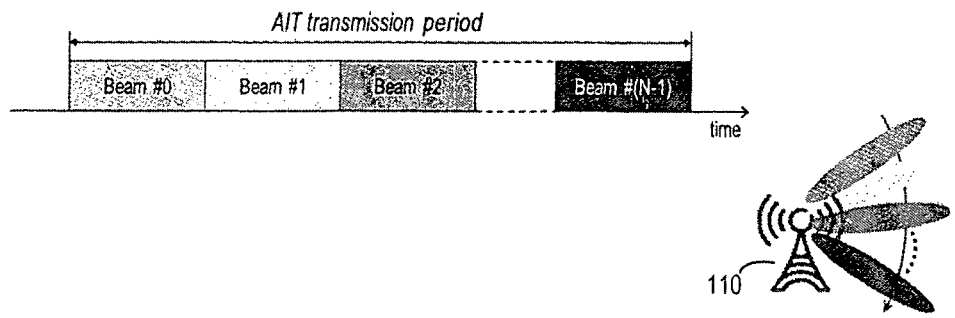
FIGS. 1 and 2 are example transmission timing for the AIT in the prior art.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a BS include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as an example of the network device.

As used herein, the term "terminal device" or "user equipment" (UE) refers to any device having wireless or wired communication capabilities. Examples of the terminal device include, but not limited to, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. The terminal device may also include vehicles in Vehicle-to Everything (V2x) communications via Device-to-Device (D2D) sidelink, or cellular uplink. For the purpose of discussion, in the following, some embodiments will be described with reference to UEs as examples of terminal devices and the terms "terminal device" and "user equipment" (UE) may be used interchangeably in the context of the present disclosure.

As used herein, the term "time duration" refers to a duration of time for which a signal is transmitted. The term "broadcasting gap" refers to a gap between different time durations for broadcasting signaling transmission where the broadcasting signaling cannot be transmitted. For example, if a signal needs to be broadcast in multiple time durations, there will be several broadcasting gaps between the time durations where the signal cannot be broadcast.

As used herein, the term "broadcast signaling" refers to any suitable signaling that is broadcast by the network device. The broadcast signaling may include, but not limited to, the AIT, the SS, paging message, and other system information.

As used herein, the term "broadcasting scheme" or "broadcasting pattern" or "transmission (TX) pattern" refers to a scheme or pattern for transmitting broadcast signaling, including, but not limited to, a time duration for broadcast signaling transmission, a broadcasting gap between different time durations, beamforming schemes, a start time for broadcast signaling transmission, and the like. For the purpose of discussion, the terms "broadcasting scheme" and "broadcasting pattern" may be used interchangeably in the context of the present disclosure.

As used herein, the term "transmission period" refers to a cycle in which system information is broadcast periodically. The transmission period may contain a transmission window which is completely contained in the transmission period. The transmission window may be shorter than or equal to the transmission period. Furthermore, the transmission window may be located at any suitable position in the transmission period. By way of example, the start time of the transmission window may be aligned to the start time of the transmission period.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

As described above, a typical time period (or a transmission period) for transmitting the AIT is 10.24 seconds. That is, if a UE is unable to successful decode the AIT, the UE has to wait for 10.24 seconds to try another detection. In order to increase the transmission gain, in the NR system, multiple beams or repetitions are used in the transmission of the broadcast signals. Typically, the multiple beams or repetitions occupy a relatively longer time period. In the time period, the network device continuously sweeps the beams for transmitting the AIT or SS.

Figure 2:
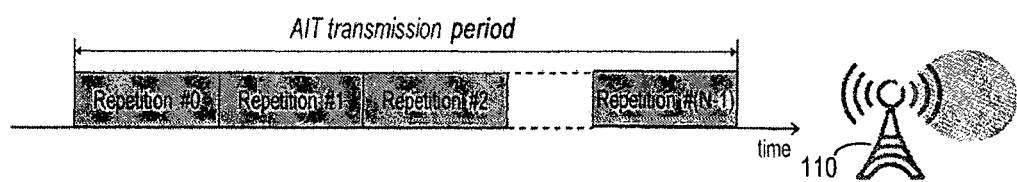

FIGS. 1 and 2 show example transmission timing for the AIT in the prior art. As shown in FIG. 1, in the AIT transmission period based on the multiple beams, a network device 110 uses different specific beams (for example, Beam #0, Beam #1, Beam #2, . . . , Beam #(N−1)) to broadcast the AIT in continuous time durations. Likewise, in the AIT transmission period based on the multiple repetitions as shown in FIG. 2, the network device 110 transmits multiple repetitions (for example, Repetition #0, Repetition #1, Repetition #2, . . . , Repetition #(N−1)) of the AIT in continuous time durations.

However, the long time periods may interrupt normal uplink and/or downlink communications between the network device and the terminal devices served by the network device. Accordingly, the time periods may significantly degrade the system performance and there be unacceptable.

For example, if an analogue beamforming scheme is used at the network device, the network device is unable to perform receiving operations during the time period for transmitting the broadcast signal, and therefore a terminal device is not allowed to transmit any information to the network device in uplink (UL). When the network device takes a long time period to transmit the broadcast signals such as the AIT or SS via beam sweeping and/or transmission repetitions, the resulted uplink service interruption may influence both ongoing UL data transmissions and subsequent UL data transmissions and therefore be unacceptable.

In particular, in the case that some urgent uplink traffic information is to be transmitted, the time period for broadcast signaling transmission will bring an unendurable long time delay. For example, if a terminal device intends to transmit a random access request or a fast acknowledgement (ACK)/negative ACK (NACK) feedback in the time period, the terminal device has to wait a long time, which may degrade UL transmission performance and efficiency.

Furthermore, a long data service interruption in downlink (DL) may also be induced if all antenna ports are used for the SS/AIT transmission because the data transmission and the SS/AIT transmission may probably need different beams. For example, in a Frequency Division Duplex (FDD) system, a precoding matrix for a DL or UL data transmission is generally different from beams used for the SS/AIT transmission. As a result, the long data service interruption may occur in both DL and UL.

In addition, if a digital beamforming scheme is used at the network device, a long data service interruption in UL will occur in a Time Division Duplex (TDD) system due to the long time period for the SS/AIT transmission in DL. In order to avoid such long time traffic interruptions, a more flexible transmission scheme for the broadcast signals is needed.

In order to at least in part solve the above and other potential problems, embodiments of the present disclosure reduce inappropriate interruptions during the transmission of broadcast signaling by means of a new broadcasting scheme designed for the broadcast transmission. According to some embodiments of the present disclosure, a broadcast signaling is transmitted by a network device in time durations that are separated from each other by broadcasting gaps. In this way, the network device can use a broadcasting gap between the two neighboring time durations for the broadcast transmission to communicate with the terminal devices served by the network device. The use of non-consecutive time durations may significantly reduce the interruptions caused by the long-time period reserved for continuously transmitting the broadcast signal.

In addition, some embodiments of the present disclosure provide configurations of broadcasting patterns, signaling related to the configurations, and corresponding procedures of a terminal device for detecting a broadcast signal.

Figure 3:
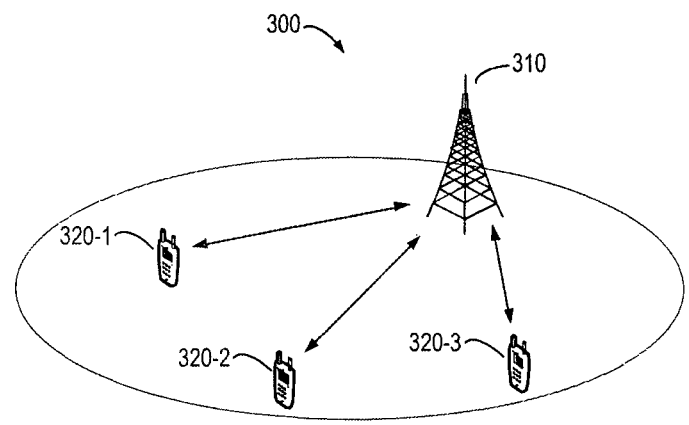
FIG. 3 is a communication network in which embodiments of the present disclosure can be implemented.

FIG. 3 shows an example communication network 300 in which embodiments of the present disclosure can be implemented. The network 300 includes a network device 310 and three terminal devices 320-1, 320-2, and 320-3 (collectively referred to as a "terminal device" 320). It is to be understood that the number of network devices and terminal devices is only for the purpose of illustration without suggesting any limitations. The network 100 may include any suitable number of network devices and the terminal devices adapted for implementing embodiments of the present disclosure.

The terminal devices 320 may communicate with the network device 310 and communicate via the network device 310 with each other. The communications may conform to any suitable standard including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, as described above, the broadcast signaling is transmitted in consecutive time durations, which is composed of a relatively long transmission period, by using multiple beams or repetitions. The transmission period may cause an unacceptable interrupt in UL and/or DL and therefore degrade the system performance. According to embodiments of the present disclosure, the network device 310 transmits the broadcast signaling in separated time durations and communicates with one or more of the terminal devices 320 in a broadcasting gap between two neighboring time durations for broadcast signaling.

Figure 4:
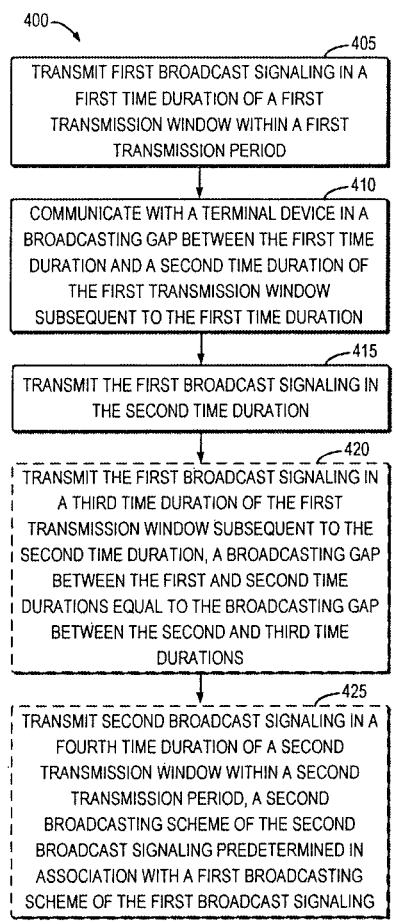
FIG. 4 is a flowchart of a method at a network device according to some embodiments of the present disclosure.

FIG. 4 shows a flowchart of an example method 400 at the network device 310 according to some embodiments of the present disclosure. As shown, at block 405, the network device 310 transmits broadcast signaling (referred to as "first broadcast signaling") in a time duration (referred to as a "first time duration") of a transmission window (referred to as a "first transmission window") within a transmission period (referred to as a "first transmission period"). Then, at block 410, the network device 310 communicates with the terminal device 320 (for example, the terminal device 320-2, 320-3) which are served by the network device 310 in a broadcasting gap between the first time duration and another time duration (referred to as a "second time duration") of the first transmission window subsequent to the first time duration. The communication between the network 310 and the terminal device 320 may be occur in any suitable time duration within the broadcasting gap. Next, at block 415, the network device 310 transmits the first broadcast signaling in the second time duration.

According to embodiments of the present disclosure, the broadcasting gap between the first and second time durations may be used for ongoing UL data transmissions and newly emerging UL data transmissions between the network device 310 and the terminal devices 320. The broadcasting gap may also be used for UL transmission, such as fast ACK/NACK and quick random access, from the terminal devices 320 to the network device 310.

In this way, the broadcast signaling, such as the AIT/SS information bits, may be transmitted with beam-sweeping and/or repetitions within a predetermined transmission window in a predetermined pattern in each transmission period. Accordingly, on one hand, the broadcasting gap between two broadcasting opportunities may be utilized for UL/DL transmission between the network device 310 and the terminal devices 320. Therefore, the interruption due to the broadcast signaling transmission is reduced.

On the other hand, the use of the transmission window within a transmission period for the broadcast signaling transmission may make further time periods within the transmission period available for other transmissions, and therefore the interruptions of UL/DL communications may be further avoided. Additionally, considering that the terminal devices 320 blindly detect the broadcast signaling, a shorter transmission window may reduce processing complexity and increase repetition gain for the terminal devices. Example operations and features at the terminal devices 320 will be described in the following paragraphs with reference to FIG. 8.

The transmitting of the broadcast signaling, such as AIT or SS, at blocks 405 and 415 may be implemented in any suitable way. In some embodiments, beam sweeping may be applied to provide the omni-coverage of the first broadcast signaling. For example, the broadcasting may be performed by the network device 310 using beam sweeping. For example, in the first time duration, the network device 310 may transmit the first broadcast signaling in a first beam direction. In the second time duration, the network device 310 may transmit the first broadcast signaling in a second beam direction. The first and second beam directions are different and both obtained from a set of beam directions.

Figure 5:
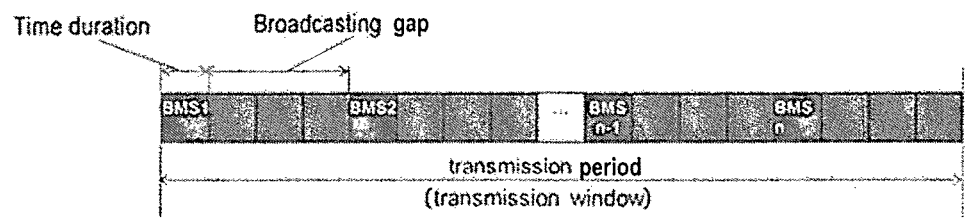
FIGS. 5-7 are example time durations for broadcast signaling transmission according to some embodiments of the present disclosure.
Figure 6:
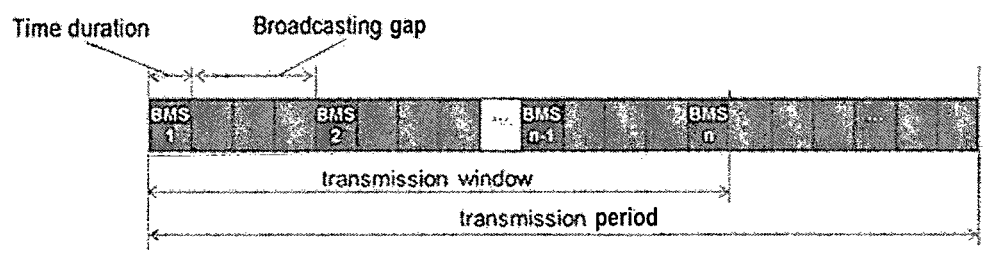
Figure 7:
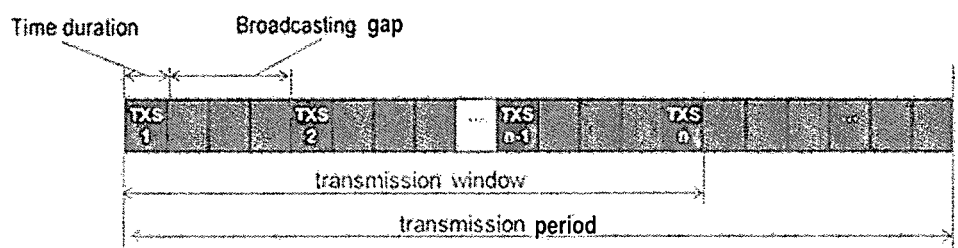

By way of example, the whole transmission window may be divided into multiple non-consecutive durations for broadcast signaling as shown by any of FIG. 5 to FIG. 7. Furthermore, the beams for the broadcast signaling transmission can be divided into multiple sets. The omni-coverage of the first broadcast signaling is provided by broadcasting the first broadcast signaling using the multiple non-consecutive transmissions with the multiple beams. As shown at block 410, the broadcasting gap between the neighboring time durations for broadcast signaling may be used for communicating between the network device and the terminal device. In this way, the time durations for the UL/DL communications and the time durations for the broadcast signaling transmissions are interleaved.

In some other embodiments, the broadcasting may be based on transmission repetitions. For example, in the first and second time durations, the network device 310 may transmit the first broadcast signaling twice, for example, with omni-directional antennas. Likewise, the repetition patterns may be obtained from a transmission set (TXS). For instance, each transmission window may include a number of transmission repetitions. The terminal devices 320 may tentatively decode the combined signaling of each transmission repetition or multiple transmission repetitions. The operations of the terminal devices 320 will be described in detail in the following paragraphs with reference to FIG. 8.

The use of the beam set (for the beam-sweeping option) and transmission set (for repetition option) concepts for the system information distribution may avoid the terminal device to frequently wake up to monitor and attempt to detect the broadcast signaling, such as SS/AIT. Further, resulting radio resource fragmentation due to DL/UL switch may be reduced.

In addition, if each transmitter provides the repetition of one different beam, the terminal devices 320 do not need to combine the symbol information between transmitters. Then, it is not necessary for the terminal devices 320 to buffer symbol information for different repetitions to attempt different combinations. Accordingly, the complexity of the UE for decoding the broadcast signaling due to buffering of the symbol information for many repetitions and different combination attempts for broadcast signaling decoding may be reduced.

According to embodiments of the present disclosure, the time duration for broadcasting the first broadcast signaling may be determined by considering any suitable factors. In some embodiments, the time duration may be specific to broadcast signaling. For example, different broadcast signaling usually have different message sizes and different quality/coverage requirements, the time duration for transmitting different broadcast signaling may be different. In some embodiments, the time duration of the broadcast signaling transmission may be associated with a carrier frequency of the broadcast signaling. For example, the broadcast signaling may be broadcast in a higher carrier frequency in a shorter time duration, such as a shorter Transmission Time interval (TTI) length. In other words, the time duration for the broadcast signaling in the higher carrier frequency may be shorter than that for the broadcast signaling in a lower carrier frequency.

In some other embodiments, the time duration may also depend on, for example, a transmission power of the network device 310, a receiver scheme of the terminal devices 320, transmission beamforming at the network device 310, and receiver beamforming at the terminal devices 320, radio propagation environments, and the like.

Likewise, the broadcasting gap between neighboring time durations for broadcast signaling may be determined by considering any suitable factors. In some embodiments, the broadcasting gap may be associated with a carrier frequency of communications in the broadcasting gap. For example, the broadcasting gap during which DL data or UL information (including UL signaling and/or data) is transmitted in a higher carrier frequency may be shorter than the broadcasting gap during which DL data or UL information is transmitted in a lower carrier frequency.

In some embodiments, the broadcasting gap may be associated with the application scenario of a radio system. For example, for the scenario applied for the delay sensitive service, the broadcasting gap shall be short to reduce the delay of the service data transmission.

In some other embodiments, the broadcasting gaps between neighboring time durations for broadcast signaling may be the same. In these embodiments, as shown at block 420, the network device 310 may further transmit the first broadcast signaling in a third time duration of the first transmission window subsequent to the second time duration. The broadcasting gap between the second and third time durations is equal to the broadcasting gap between the first and second time durations.

FIGS. 5-7 shows example time durations for broadcast signaling transmission according to some embodiments of the present disclosure. As shown, in these examples, the time durations are evenly distributed in the transmission window within the transmission period.

As shown in FIG. 5, broadcast signaling is transmitted in different time durations using different beams from a beam set (including, for example, BMS 1, . . . , BMS n). Such time durations based on the beam set provides a subarea of the omni-coverage for the broadcast signaling. In addition, in this example, the transmission window is equal to the transmission period. The example as shown in FIG. 6 is similar to that in FIG. 5 except for the shorter transmission window. FIG. 7 shows an example where a transmission pattern similar to those in FIGS. 5 and 6 is applied for broadcast signaling transmissions with repetitions. As show, in these examples, the transmission window usually locates at the start of each broadcast signaling transmission period.

In addition to time-related parameters for the broadcast signaling transmission, other parameters or aspects related to broadcasting schemes may be designed. For example, considering the larger coverage, the higher TX beamforming gain and/or a larger number of TX repetitions may be needed. Furthermore, the TTI length, the cyclic prefix length, the frequency bandwidth allocated for the broadcast signaling may also be designed.

According to the well-designed broadcasting pattern, the broadcast signaling (for example, AIT/SS) would not be consecutively transmitted. For example, the time duration for broadcast signaling transmission and the time duration for service data may be interleaved according to the predetermined patterns. In this way, said service interruption due to the broadcast signaling transmission can be controlled in an endurable level.

In order to reduce the operation complexity of the terminal device for monitoring the broadcast signaling and to reduce signaling overhead, in some embodiments, association or dependency between different broadcast signaling can be predetermined. In this way, if the transmission (TX) pattern of one type of broadcast signaling is determined by blind detection, the terminal device may determine the TX pattern of another type of broadcast signaling. In these embodiments, as shown at block 425, the network device 310 may transmit second broadcast signaling in a fourth time duration of a second transmission window within a second transmission period. The broadcast scheme of the second broadcast signaling may be predetermined in association with the first broadcast scheme of the first broadcast signaling.

For example, the TX pattern of the AIT can be dependent on the TX pattern of the SS. The TX pattern of paging message can be dependent on the SS TX pattern as well. As another example, the TX pattern of the paging message can also be indicated by the system information, such as the AIT.

In some embodiments, in order to further reduce the complexity of the terminal device, the TX pattern of some broadcast signals, for example, the SS, may be implicitly indicated by the SS sequence. For example, different SS sequence sets may indicate different patterns that are used for the SS. Accordingly, the terminal device may determine the SS TX pattern once the SS is detected.

In some other embodiments, the TX patterns of different broadcast signaling may be predefined so as to further simplify the TX pattern determination complexity and/or reduce signaling overhead. In some embodiments, only the TX pattern of SS is predefined, and the TX patterns of other broadcast signaling depend on the SS pattern.

In this way, different patterns may be used for different broadcast signaling. Certain dependency of the TX patterns of different broadcast signals may be necessary in order to save the signaling to notify the TX pattern to the terminal device or reduce the complexity/delay for the terminal device to determine the TX pattern by blind detection.

Figure 8:
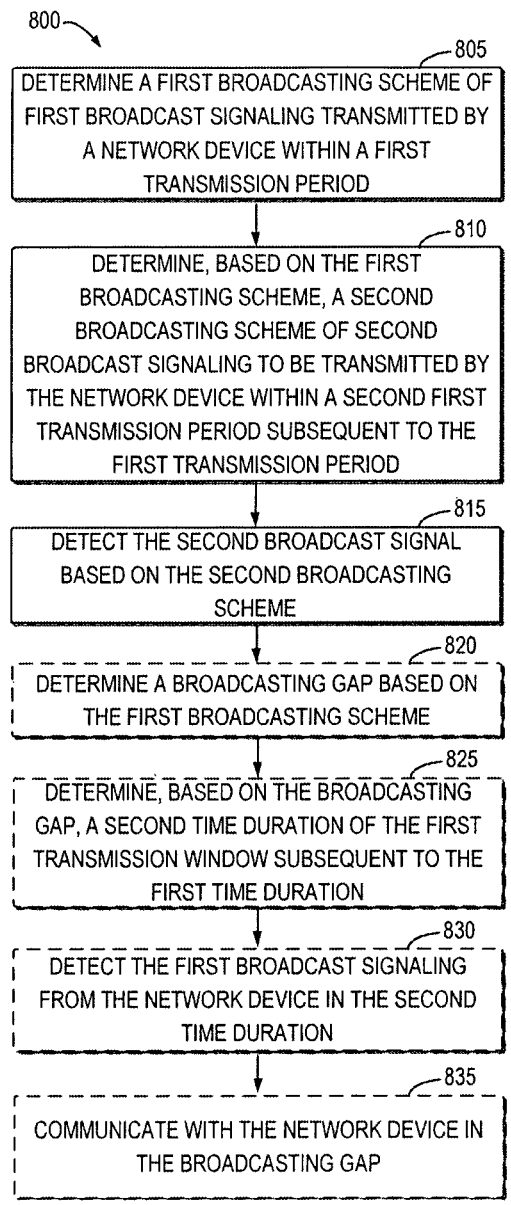
FIG. 8 is a flowchart of a method at a terminal device according to some embodiments of the present disclosure.

Accordingly, the terminal devices 320 may use the association or dependency between different broadcasting schemes for different broadcast signaling. FIG. 8 shows a flowchart of an example method 800 at the terminal device according to some embodiments of the present disclosure. The method 800 can be implemented at the terminal device 320-1 as shown in FIG. 3. For the purpose of discussion, the method 800 will be described with reference to FIG. 3.

As shown, at block 805, the terminal device 320-1 determines the first broadcasting scheme of the first broadcast signaling. The obtaining may be implemented in any suitable way. As described above, in some embodiments, candidate TX patterns for different broadcast signaling may be predefined. In these embodiments, the predefined candidate TX patterns may be stored in the terminal device side.

In some embodiments, the TX pattern of some broadcast signaling may be implicitly indicated in the broadcast signaling. For example, the TX pattern of the SS may be indicated by the SS sequence. In these embodiments, the terminal device 320-1 may detect the first broadcast signaling from the network device. In response to the first broadcast signaling being detected in the first time duration of the first transmission window within the first transmission period, the terminal device 320-1 may determine the first broadcasting scheme from the first broadcast signaling for later communication with the network device.

At block 810, the terminal device 320-1 determines the second broadcasting scheme of the second broadcast signaling based on the first broadcasting scheme. Block 810 may not be necessary since the predetermined associations or dependencies between the TX patterns of different broadcast signaling may be stored at the terminal device 320-1 in some embodiments. Alternatively, the terminal device 320-1 may determine the second broadcasting scheme of the second broadcast signaling from the first broadcasting scheme of the first broadcast signaling after block 810.

By way of example, in the embodiments where the TX pattern of the AIT depends from the TX pattern of the SS, if the TX pattern of the SS is determined, for example, by the signaling sequence, the TX pattern of the AIT signaling may be determined.

At block 815, the terminal device 320-1 detects the second broadcast signaling from the network device 310 based on the second broadcasting scheme. For example, after obtaining the SS signal, the possible start position of AIT may be determined by decoding the SS as an indication message. Then, the AIT may be detected with the determined position and TX pattern. It is noted that the terminal device 320-1 may blindly detect the second broadcast signaling from the network device 310 if it doesn't know the second broadcasting scheme at block 810. The terminal device 320-1 may save power consumption if it knows the second broadcasting scheme because it can estimate the approximate time position to detect the second broadcast signaling and take a rest while waiting for the coming duration.

As described above, according to embodiments of the present disclosure, the broadcast signaling may be broadcast in non-consecutive time durations having a predetermined broadcasting gap. In these embodiments in repetition scenario, as shown, at block 820, the terminal device 320-1 may determine the broadcasting gap based on the first broadcasting scheme. At block 825, the terminal device 320-1 may determine, based on the broadcasting gap, a second time duration of the first transmission window after the first time duration. At block 830, the terminal device 320-1 may detect the first broadcast signaling from the network device in the second time duration.

The transmission repetitions may cause an additional complexity for the terminal device 320-1 to decode the broadcast signaling if the terminal device 320-1 is unaware of the TX pattern because the UE has to buffer the symbol information for many repetitions and try different combinations for broadcast signaling decoding. If the TX pattern of the second broadcast signaling can be known based on the detection of the previous broadcast signals, the terminal device 320-1 know exactly how to combine the symbol information for detection of the second broadcast signal.

In addition, in the transmission repetitions, the terminal device 320-1 may tentatively decode the combined signaling of each TXS or multiple TXS. As the terminal device 320-1 blindly detects the broadcast signaling, the length of the broadcast signaling transmission window should be as short as possible so that processing complexity of the terminal device 320-1 may be reduced and the repetition gains may be increased.

As described above, after the terminal device 320-1 determines the TX pattern of the broadcast signaling, the terminal device 320-1 may determine the corresponding broadcasting gap. After successfully decoding the first broadcast signaling and getting accessed to the network, at block 835, the terminal device 320-1 may communicate with the network device in the broadcasting gap.

For example, the terminal device 320-1 may monitor the downlink data transmission and scheduling commands for the uplink transmissions in the broadcasting gap. The terminal device 320-1 may also send the scheduling request or perform random access in the broadcasting gap according to the configurations from the network.

According to embodiments of the present disclosure, with the designed pattern for broadcast signaling transmission, in the broadcasting gaps between non-consecutive time durations, the terminal devices 320-2 and 320-3 in addition to the terminal device 320-1 may communicate with the network device 310 in DL/UL. In this way, the system performance and efficiency may be improved.

It is to be understood that all operations and features related to the network device 310 described above with reference to FIGS. 3 to 7 are likewise applicable to the method 800 and have similar effects. For the purpose of simplification, the details will be omitted.

Figure 9:
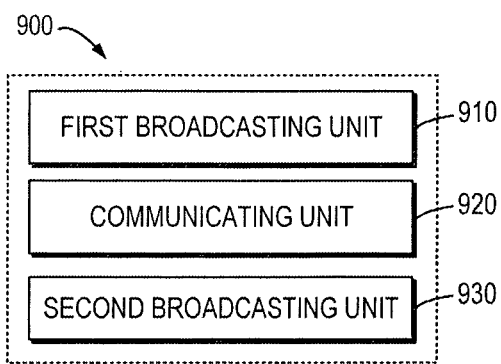
FIG. 9 is a block diagram of a network device in accordance with some embodiments of the present disclosure.

FIG. 9 shows a block diagram of a network device 900 in accordance with some embodiments of the present disclosure. The network device 900 can be considered as an example implementation of the network device 310 as shown in FIG. 3.

As shown, the network device 900 comprises: a first broadcasting unit 910 configured to transmit first broadcast signaling in a first time duration of a first transmission window within a first transmission period; a communicating unit 920 configured to communicate with a terminal device in a broadcasting gap between the first time duration and a second time duration of the first transmission window subsequent to the first time duration; a second broadcasting unit 930 configured to transmit the first broadcast signaling in the second time duration.

In some embodiments, the first broadcasting unit 910 may be configured to transmit the first broadcast signaling in the first time duration in a first beam direction of a set of beam directions. The second broadcasting unit 930 may be configured to transmit the first broadcast signaling in the second time duration in a second beam direction of the set of beam directions. The first beam direction is different from the second beam direction.

In some embodiments, the broadcasting gap may be associated with one or more of the following: a carrier frequency for downlink data communicated in the broadcasting gap, a carrier frequency for uplink information communicated in the broadcasting gap, a delay requirement of the downlink data, and a delay requirement of the uplink information.

In some embodiments, one or more of the first and second time durations may be associated with one or more of the following: a carrier frequency for the first broadcast signaling, a type of the first broadcast signaling, a delay requirement of downlink data communicated in the broadcasting gap, and a delay requirement of uplink information communicated in the broadcasting gap.

In some embodiments, the first broadcast signaling may include one or more of the following: a signature sequence, an access information table, and a paging message.

In some embodiments, the network device 900 may further comprise: a third broadcasting unit configured to transmit the first broadcast signaling in a third time duration of the first transmission window subsequent to the second time duration. The broadcasting gap between the first and second time durations is equal to the broadcasting gap between the second and third time durations.

In some embodiments, the network device 900 may further comprise: a fourth broadcasting unit configured to transmit second broadcast signaling in a fourth time duration of a second transmission window within a second transmission period. The first broadcasting scheme of the first broadcast signaling is predetermined in association with the second broadcasting scheme of the second broadcast signaling. In some embodiments, the first broadcast signaling may include a signature sequence, and the second broadcast signaling may include an access information table.

Figure 10:
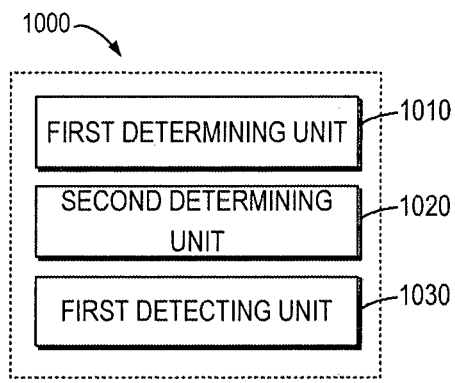
FIG. 10 is a block diagram of a terminal device in accordance with some embodiments of the present disclosure.

FIG. 10 shows a block diagram of a terminal device 1000 in accordance with some embodiments of the present disclosure. The terminal device 1000 can be considered as an example implementation of the terminal devices 320 as shown in FIG. 3.

As shown, the terminal device 1000 comprises: a first determining unit 1010 configured to determine the first broadcasting scheme of the first broadcast signaling transmitted by a network device within a first transmission period; a second determining unit 1020 configured to determine, based on the first broadcasting scheme, the second broadcasting scheme of the second broadcast signaling to be transmitted by the network device within a second first transmission period subsequent to the first transmission period; and a first detecting unit 1030 configured to detect the second broadcast signaling from a network device based on the second broadcasting scheme.

In some embodiments, the first determining unit 1010 may comprise: a second detecting unit configured to detect first broadcast signaling within the first transmission period; and a third determining unit configured to determining the first broadcasting scheme based on the detected first broadcast signal.

In some embodiments, the terminal device 1000 may further comprise: a fourth determining unit configured to determine a broadcasting gap based on the first broadcasting scheme; a fifth determining unit configured to determine, based on the broadcasting gap, a second time duration of the first transmission window subsequent to the first time duration; and a third detecting unit configured to detect the first broadcast signaling from the network device in the second time duration.

In some embodiments, the broadcasting gap may be associated with one or more of the following: a carrier frequency for downlink data communicated in the broadcasting gap, a carrier frequency for uplink information communicated in the broadcasting gap, a delay requirement of the downlink data, and a delay requirement of the uplink information.

In some embodiments, one or more of the first and second time durations may be associated with one or more of the following: a carrier frequency for the first broadcast signaling, a type of the first broadcast signaling, a delay requirement of downlink data communicated in the broadcasting gap, and a delay requirement of uplink information communicated in the broadcasting gap.

In some embodiments, the terminal device 1000 may further comprise: a communicating unit configured to communicate with the network device in the broadcasting gap between the first and second time durations.

In some embodiments, the first broadcast signaling may include one or more of the following: a signature sequence, an access information table, and a paging message. The second broadcast signaling may include one or more of the following: a signature sequence, an access information table, and a paging message.

In some embodiments, the first broadcast signaling may include a signature sequence, and the second broadcast signaling may include an access information table.

It should be appreciated that units included in the network device 900 and the terminal device 1000 correspond to the blocks of the methods 400 and 800. Therefore, all operations and features described above with reference to FIGS. 3 to 8 are likewise applicable to the units included in the network device 900 and the terminal device 1000 and have similar effects. For the purpose of simplification, the details will be omitted.

The units included in the network device 900 and the terminal device 1000 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the network device 900 and the terminal device 1000 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 11:
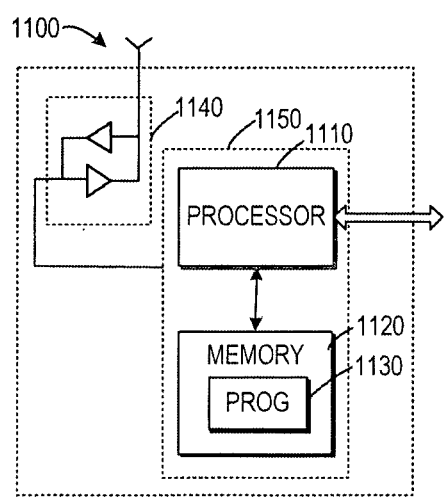
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the network device 310 or the terminal devices 320 as shown in FIG. 3. Accordingly, the device 1100 can be implemented at or as at least a part of the network device 310 or the terminal devices 320, respectively.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 1130 is assumed to include program instructions that, when executed by the associated processor 1110, enable the device 1100 to operate in accordance with the embodiments of the present disclosure, as discussed herein with reference to FIGS. 1 to 5. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method as described above with reference to any of FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a network device, comprising:
    transmitting first broadcast signaling in a first time duration of a first transmission window within a first transmission period, wherein transmitting the first broadcast signaling in the first time duration comprises transmitting the first broadcast signaling in the first time duration in a first beam direction of a set of beam directions;
    transmitting or receiving a non-broadcast signal with a terminal device in a broadcasting gap between the first time duration and a second time duration of the first transmission window, the second time duration being subsequent to the first time duration; and
    transmitting the first broadcast signaling in the second time duration, wherein transmitting the first broadcast signaling in the second time duration comprises transmitting the first broadcast signaling in the second time duration in a second beam direction of the set of beam directions, the first beam direction being different from the second beam direction.

2. The method of claim 1, wherein the broadcasting gap is associated with one or more of the following:
a carrier frequency for downlink data communicated in the broadcasting gap,
a carrier frequency for uplink information communicated in the broadcasting gap,
a delay requirement of the downlink data, and
a delay requirement of the uplink information.

3. The method of claim 1, wherein one or more of the first and second time durations are associated with one or more of the following:
a carrier frequency for the first broadcast signaling,
a type of the first broadcast signaling,
a delay requirement of downlink data communicated in the broadcasting gap, and
a delay requirement of uplink information communicated in the broadcasting gap.

4. The method of claim 1, wherein the first broadcast signaling includes one or more of the following: a signature sequence, an access information table, and a paging message.

5. The method of claim 1, further comprising:
transmitting the first broadcast signaling in a third time duration of the first transmission window, the third time duration being subsequent to the second time duration, wherein a broadcasting gap between the second and third time durations is equal to the broadcasting gap between the first and second time durations.

6. The method of claim 1, wherein the first broadcast signaling is transmitted using a first broadcasting scheme, and the method further comprises:
using a second broadcasting scheme associated with the first broadcasting scheme to transmit second broadcast signaling in a fourth time duration of a second transmission window within a second transmission period.

7. The method of claim 6, wherein the first broadcast signaling includes a signature sequence and the second broadcast signaling includes an access information table.

8. A method implemented at a terminal device, comprising:
determining a first broadcasting scheme of first broadcast signaling transmitted by a network device within a first transmission period in a first beam direction of a set of beam directions;
transmitting or receiving a non-broadcast signal with the network device in a broadcasting gap between a first time duration and a second time duration of the first transmission period, the second time duration being subsequent to the first time duration;
determining, based on the first broadcasting scheme, a second broadcasting scheme of second broadcast signaling to be transmitted by the network device within a second transmission period subsequent to the first transmission period and in a second beam direction of the set of beam directions, the first beam direction being different from the second beam direction; and
detecting the second broadcast signaling based on the second broadcasting scheme.

9. The method of claim 8, wherein determining the first broadcasting scheme comprises:
detecting the first broadcast signaling within the first transmission period; and
determining the first broadcasting scheme based on the detected first broadcast signaling.

10. The method of claim 9, wherein detecting the first broadcast signaling comprises:
detecting the first broadcast signaling in a first time duration of a first transmission window within the first transmission period.

11. The method of claim 10, further comprising:
determining a broadcasting gap based on the first broadcasting scheme;
determining, based on the broadcasting gap, a second time duration of the first transmission window, the second time duration being subsequent to the first time duration; and
detecting the first broadcast signaling in the second time duration.

12. The method of claim 11, wherein the broadcasting gap is associated with one or more of the following:
a carrier frequency for downlink data communicated in the broadcasting gap,
a carrier frequency for uplink information communicated in the broadcasting gap,
a delay requirement of the downlink data, and
a delay requirement of the uplink information.

13. The method of claim 11, wherein one or more of the first and second time durations are associated with one or more of the following:
a carrier frequency for the first broadcast signaling,
a type of the first broadcast signaling,
a delay requirement of downlink data communicated in the broadcasting gap, and
a delay requirement of uplink information communicated in the broadcasting gap.

14. The method of claim 11, further comprising:
communicating with the network device in the broadcasting gap.

15. The method of claim 8, wherein one or more of the first and broadcast signaling include one or more of the following: a signature sequence, an access information table, and a paging message.

16. The method of claim 8, wherein the first broadcast signaling includes a signature sequence, and the second broadcast signaling includes an access information table.

17. A device, comprising:
a processor and a memory, the memory containing instructions executable by the processor to:
transmit first broadcast signaling in a first time duration of a first transmission window within a first transmission period in a first beam direction of a set of beam directions;
transmit or receive a non-broadcast signal with a terminal device in a broadcasting gap between the first time duration and a second time duration of the first transmission window, the second time duration being subsequent to the first time duration; and
transmit the first broadcast signaling in the second time duration and in a second beam direction of the set of beam directions, the first beam direction being different from the second beam direction.

18. A device, comprising:
a processor and a memory, the memory containing instructions executable by the processor to:
determine a first broadcasting scheme of first broadcast signaling transmitted by a network device within a first transmission period in a first beam direction of a set of beam directions;
transmit or receive a non-broadcast signal with the network device in a broadcasting gap between a first time duration and a second time duration of the first transmission period, the second time duration being subsequent to the first time duration;

determine, based on the first broadcasting scheme, a second broadcasting scheme of second broadcast signaling to be transmitted by the network device within a second transmission period subsequent to the first transmission period and in a second beam direction of the set of beam directions, the first beam direction being different from the second beam direction; and detect the second broadcast signaling based on the second broadcasting scheme.

19. A non-transitory computer readable storage medium tangibly storing a computer program, the computer program including instructions which, when executed on at least one processor, cause the at least one processor to:

transmit first broadcast signaling in a first time duration of a first transmission window within a first transmission period in a first beam direction of a set of beam directions;

transmit or receive a non-broadcast signal with a terminal device in a broadcasting gap between the first time duration and a second time duration of the first transmission window, the second time duration being subsequent to the first time duration; and transmit the first broadcast signaling in the second time duration and in a second beam direction of the set of beam directions, the first beam direction being different from the second beam direction.

20. A non-transitory computer readable storage medium tangibly storing a computer program, the computer program including instructions which, when executed on at least one processor, cause the at least one processor to:

determine a first broadcasting scheme of first broadcast signaling transmitted by a network device within a first transmission period in a first beam direction of a set of beam directions;

transmit or receive a non-broadcast signal with the network device in a broadcasting gap between a first time duration and a second time duration of the first transmission period, the second time duration being subsequent to the first time duration;

determine, based on the first broadcasting scheme, a second broadcasting scheme of second broadcast signaling to be transmitted by the network device within a second transmission period subsequent to the first transmission period and in a second beam direction of the set of beam directions, the first beam direction being different from the second beam direction; and detect the second broadcast signaling based on the second broadcasting scheme.

* * * * *